(12) United States Patent
Costeux et al.

(10) Patent No.: US 9,187,611 B2
(45) Date of Patent: Nov. 17, 2015

(54) NANOPOROUS POLYMERIC FOAM HAVING HIGH CELL DENSITY WITHOUT NANOFILLER

(75) Inventors: Stephane Costeux, Midland, MI (US); Lingbo Zhu, Midland, MI (US); Hyun Jeon, Rosharon, TX (US); Shana P. Bunker, Midland, MI (US); Thomas H. Kalantar, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 556 days.

(21) Appl. No.: 13/578,092

(22) PCT Filed: Feb. 23, 2011

(86) PCT No.: PCT/US2011/025782
§ 371 (c)(1),
(2), (4) Date: Aug. 9, 2012

(87) PCT Pub. No.: WO2011/112352
PCT Pub. Date: Sep. 15, 2011

(65) Prior Publication Data
US 2012/0321873 A1 Dec. 20, 2012

Related U.S. Application Data

(60) Provisional application No. 61/312,396, filed on Mar. 10, 2010.

(51) Int. Cl.
*C08J 9/12* (2006.01)
*C08J 9/00* (2006.01)

(52) U.S. Cl.
CPC ............... *C08J 9/122* (2013.01); *C08J 9/0071* (2013.01); *C08J 2201/024* (2013.01); *C08J 2201/032* (2013.01); *C08J 2205/046* (2013.01); *C08J 2333/10* (2013.01)

(58) Field of Classification Search
CPC ..................... C08J 2201/024; C08J 2201/032; C08J 2205/046; C08J 2333/10; C08J 9/0071; C08J 9/122
USPC .................................................. 428/212, 220
See application file for complete search history.

(56) References Cited

U.S. PATENT DOCUMENTS

| 4,025,465 | A | * | 5/1977 | Dorrn et al. | 521/134 |
| 4,367,290 | A | | 1/1983 | Ito et al. | |
| 5,153,169 | A | * | 10/1992 | Freedman et al. | 503/209 |
| 5,955,511 | A | | 9/1999 | Handa et al. | |
| 7,267,607 | B2 | | 9/2007 | Prasad | |
| 7,311,862 | B2 | | 12/2007 | Prasad | |
| 7,435,165 | B2 | | 10/2008 | Prasad | |
| 8,206,626 | B2 | | 6/2012 | Moreira et al. | |
| 2004/0082276 | A1 | | 4/2004 | Prasad | |
| 2005/0042437 | A1 | * | 2/2005 | Ramesh et al. | 428/304.4 |
| 2009/0130420 | A1 | | 5/2009 | Thiagarajan et al. | |
| 2009/0148665 | A1 | | 6/2009 | Thiagarajan et al. | |

FOREIGN PATENT DOCUMENTS

| WO | 2008003623 | 1/2008 |
| WO | 2008087559 | 7/2008 |

OTHER PUBLICATIONS

Polymer Handbook, 4th Ed., Brandrup, J. et al. eds., John Wiley & Sons publishers (2005) chapter VII pp. 682-686.
Nawaby et al., Polymer International, vol. 56, 67-73 (2007).
Lee, et al., "Determination of a mesopore size of aerogels from thermal conductivity measurement", Journal of Non-Crystalline Solids, Mar. 2002, vol. 298, pp. 287-292.
Kumar and Suh, "A Process for Making Microcellular Thermoplastic Parts", Polymer Engineering and Science, Oct. 1990, vol. 30 No. 20, pp. 1323-1329.
Krause et al. Macromolecules, vol. 34, 874-884 (2001).
Goel and Beckman, "Generation of Microcellular Polymeric Foams Using Supercritical Carbon Dioxide. II: Cell Growth and Skin Formation", Polymer Engineering and Science, Jul. 1994, vol. 34, No. 14, pp. 1148-1156.
Handa and Zhang, "A New Technique for Measuring Retrograde Vitrification in Polymer-Gas Systems and for Making Ultramicrocellular Foams from the Retrograde Phase", Journal of Pooymer Science: Part B: Polymer Physics, vol. 38, 716-725 (2000).
E. Undewood, "Quantitative Stereology", Addison-Wesley Publishing Company (1970), Chapter 2, pp. 23-27.
Yokoyama H., Sugiyama K.: "Nanocellular structures in block copolymers with CO2-philic blocks using CO2 as blowing agent: crossover from micro-to nanocellular structures with depressurization temperature". Macromolecules, vol. 38, Nov. 15, 2005, pp. 10515-10522.
Chen T., Zhang G., Zhao X.: "structure and properties of AN/MAA/AM copolymer foam plastics", Journal of Polymer Research, vol. 17, May 16, 2009, pp. 171-181.
U.S. Appl. No. 61/264,407.

* cited by examiner

*Primary Examiner* — Aaron Austin
*Assistant Examiner* — Lawrence Ferguson
(74) *Attorney, Agent, or Firm* — Steven W. Mork

(57) ABSTRACT

A polymeric foam has a thermoplastic polymer matrix defining multiple cells, the foam characterized by: (a) the polymer matrix having greater than 50 weight-percent copolymer containing at least two different monomers at least one of which is a methacrylate monomer, each monomer having a solubility parameter lower than 20 (megaPascals)$^{0.5}$ and a chemical composition where twice the mass fraction of oxygen plus the mass fraction of nitrogen, fluorine and silicon is greater than 0.2; wherein the monomers comprise at least 90 weight-percent of all monomers in the copolymer; (b) at least one of the following: (i) a nucleation site density of at least $3 \times 10^{14}$ effective nucleation sites per cubic centimeter of foamable polymer composition; (ii) an average cell size of 300 nanometer or less; (c) a porosity percentage greater than 30%; (d) an absence of nano-sized nucleating additive; and (e) a thickness of at least one millimeter.

14 Claims, 2 Drawing Sheets

NANOPOROUS POLYMERIC FOAM HAVING HIGH CELL DENSITY WITHOUT NANOFILLER

CROSS REFERENCE STATEMENT

This application claims the benefit of U.S. Provisional Application No. 61/312,396, filed on Mar. 10, 2010, which is incorporated herein by reference.

BACKGROUND OF THE INVENTION

1. Field of the Invention

The present invention relates to polymeric foam articles having nanometer sized cells (nanoporous polymeric foam articles) and processes for preparing such polymeric foam articles.

2. Description of Related Art

Polymeric foam articles (or simply "polymeric foams") are common in thermal insulation applications. Many characteristics of polymeric foams affect the thermal conductivity through the foam and, hence, the effectiveness of the foam as a thermal insulator. For instance, it is known that heat transfer through polymeric foam insulation can occur by conduction, radiation and convection (see, for example, teachings in United States patent application publication 2009/0148665). In typical polymeric foam insulation the dominant mode of heat transfer is cell gas conduction, which contributes approximately 75% of the total thermal conductivity. Hence, reducing conduction of cell gas can significantly reduce heat transfer through polymeric foams.

One characteristic affecting thermal conductivity contribution of cell gas is cell size. Cell size has little influence on gas thermal conduction when the cell size is between about one micron and one millimeter in size. Above one millimeter convection behavior tends to increase thermal conductivity. When the cell size of foam is less than about one micron the gas conductivity decreases due to what is known as the Knudsen Effect (see, for example, the relationship illustrated in FIG. 1. The curve follows the methodology in Lee, et al., "Determination of a mesopore size of aerogels from thermal conductivity measurement", Journal of Non-Crystalline Solids, March 2002, Vol. 298, pages 287-292). The Knudsen Effect is a phenomenon that results in a decrease in thermal conductivity as fewer cell gas molecules are available within each cell to collide and transfer heat within each single cell. The Knudsen Effect becomes significant as the cell size and connectivity between cells becomes on the same order of magnitude as the mean free path of the gas filling the cells. Thermal conductivity due to cell gas reduces almost in half when the cell size reduces from one micron to 300 nanometer (nm), and reduces by almost ⅔ when the cell size reduces from one micron to below 100 nm.

Homogeneous cell sizes in this range are desirable to maximize the Knudsen Effect in view of the fact that even occasional large cells can reduce the thermal insulation effect of the small (300 nm or less, preferably 150 nm or less) cells. Therefore, all things being equal, reducing the average cell size of foam to 300 nm or less and particularly to 150 nm or less is desirable to achieve lower thermal conductivity through the foam, especially in foam having a homogeneous cell size distribution. However, it is difficult to reduce the cell size without affecting other properties of a polymeric foam article.

Porosity, the ratio of void volume to foam volume, also affects the thermal conductivity of polymeric foam. Generally, decreasing porosity results in an increase in thermal conductivity. That is because thermal conductivity through the polymer network that makes up the walls defining cells of foam is typically greater than thermal conductivity across gas within the cells.

Polymeric foam having an average cell size of 300 nm or less and a porosity of greater than 0.50 is highly desirable but difficult, and highly improbable, to achieve with known blown foam technology heretofore. Notably, blown foam technology is desirable because unlike aerogel technology, for instance, blown foam technology does not require large volumes of solvents to manufacture.

In developing a process for producing foam having a particular cell size it is useful to consider the number of effective nucleation sites. Effective nucleation sites are the number of sites in a foamable polymer composition that form voids, or cells, when the foamable polymer composition expands into foam (also known as "cell density" in, for example, a paper entitled "A Process for Making Microcellular Thermoplastic Parts" by Kumar and Suh, Polymer Engineering and Science, October 1990, Vo. 30 No. 20, pages 1323-1329). By controlling the number of effective nucleation sites and the porosity one controls the average cell size of the foam. In order to achieve a desirable thermally insulating foam it is desirable to prepare polymeric foam having at least $3\times10^{14}$ effective nucleation sites per cubic centimeter of foamable polymer composition and expand that to have a porosity that is greater than 0.30 (porosity percentage greater than 30%).

It would be a desirable advancement in the art of thermally insulating polymer foam to be able to prepare polymeric foam having a thickness of at least one millimeter and having at least $3\times10^{14}$ effective nucleation sites per cubic centimeter of foamable polymer composition and that has expanded to have a porosity percentage that is greater than 30%. Even more desirable would be such polymeric foam that has an average cell size of 300 nm or less, preferably 250 nm or less, and more preferably 150 nm or less. Such a foam has been developed containing nanometer-sized filler particles (nanofiller) as reported in pending patent application U.S. Ser. No. 61/264,407. However, it is still more desirable to be able to prepare such a foam without requiring such a filler; that is, in an absence of nanofiller.

BRIEF SUMMARY OF THE INVENTION

The present invention solves the problem of preparing a thermally insulating polymeric foam having a thickness of at least one millimeter, at least $3\times10^{14}$ effective nucleation sites per cubic centimeter of foamable polymer composition, that has expanded to have a porosity percentage that is greater than 30% and having an absence of nanofiller. Even more, embodiments of the present invention solve the problem of producing such a polymeric foam having an average cell size of 300 nm or less, 250 nm or less, and even 150 nm or less.

Surprisingly, a necessary component to the solution to the problem is use of a particular type of polymer and blowing agent. The polymer is one or more than one copolymer comprising at least two different monomers, each having a solubility parameter lower than 20 (megaPascals)$^{0.5}$ and a chemical composition such that twice the mass fraction of oxygen plus the mass fraction of each of nitrogen, fluorine and silicon in the one or combination of more than one monomer is greater than 0.2; wherein at least one of the at least two different monomers is a methacrylate monomer and wherein the at least two different monomers comprise at least 90 weight-percent of the total weight of monomers in the copolymer. This methacrylate copolymer makes up more than 50 weight-percent of the polymers in the polymeric foam article and foamable polymer composition used to the polymeric foam article. The blowing agent used to prepare the polymeric foam article must contain carbon dioxide at a concentration equal to 50 to 100 mole-percent of the total blowing agent composition.

In a first aspect, the present invention is a polymeric foam article comprising a thermoplastic polymer matrix that defines multiple cells therein, the polymeric foam article characterized by: (a) the thermoplastic polymer matrix comprising greater than 50 weight-percent based on total polymer weight in the thermoplastic polymer matrix of at least one copolymer comprising at least two different monomers at least one of which is a methacrylate monomer, each of the at least two different monomers having a solubility parameter lower than 20 (megaPascals)$^{0.5}$ and a chemical composition such that twice the mass fraction of oxygen plus the mass fraction of each of nitrogen, fluorine and silicon in the one or combination of more than one monomer is greater than 0.2; wherein the at least two different monomers comprise at least 90 weight-percent of the total weight of monomers in the copolymer; (b) at least one of the following: (i) a nucleation site density of at least $3 \times 10^{14}$ effective nucleation sites per cubic centimeter of foamable polymer composition; (ii) an average cell size of 300 nanometer or less; (c) a porosity percentage that is greater than 30%; (d) an absence of nano-sized nucleating additive; and (e) a thickness of at least one millimeter.

In a second aspect, the present invention is a process for preparing the polymeric foam article of the first aspect, the process comprising: (a) Providing a foamable polymer composition comprising a thermoplastic polymer matrix and a blowing agent dispersed therein, the polymer composition having a glass transition temperature and being at an initial pressure that precludes expansion of the blowing agent and an initial temperature that is above the softening temperature of the foamable polymer composition, where the thermoplastic polymer matrix comprises greater than 50 weight-percent based on total polymer weight in the thermoplastic polymer matrix of at least one copolymer comprising at least two different monomers at least one of which is a methacrylate monomer, each of the at least two different monomers having a solubility parameter lower than 20 (megaPascals)$^{0.5}$ and a chemical composition such that twice the mass fraction of oxygen plus the mass fraction of each of nitrogen, fluorine and silicon in the one or combination of more than one monomer is greater than 0.2; wherein the at least two different monomers comprise at least 90 weight-percent of the total weight of monomers in the copolymer; (b) Cooling the foamable polymer composition to a foaming temperature that is above the softening temperature of the foamable polymer composition if the initial temperature is higher than the foaming temperature; and (c) Rapidly exposing the foamable polymer composition to an atmosphere having a pressure below the initial pressure and allowing the foamable polymer composition to expand into a polymeric foam article having a thickness of at least one millimeters; wherein the glass transition temperature of the thermoplastic polymer matrix is greater than 85° C. and the foaming temperature is at least 40° C. below the glass transition temperature of the thermoplastic polymer matrix.

The process of the present invention is useful for preparing the polymeric foam of the present invention. The polymeric foam of the present invention is useful as a thermally insulating material.

DETAILED DESCRIPTION OF THE INVENTION

Figure 1:
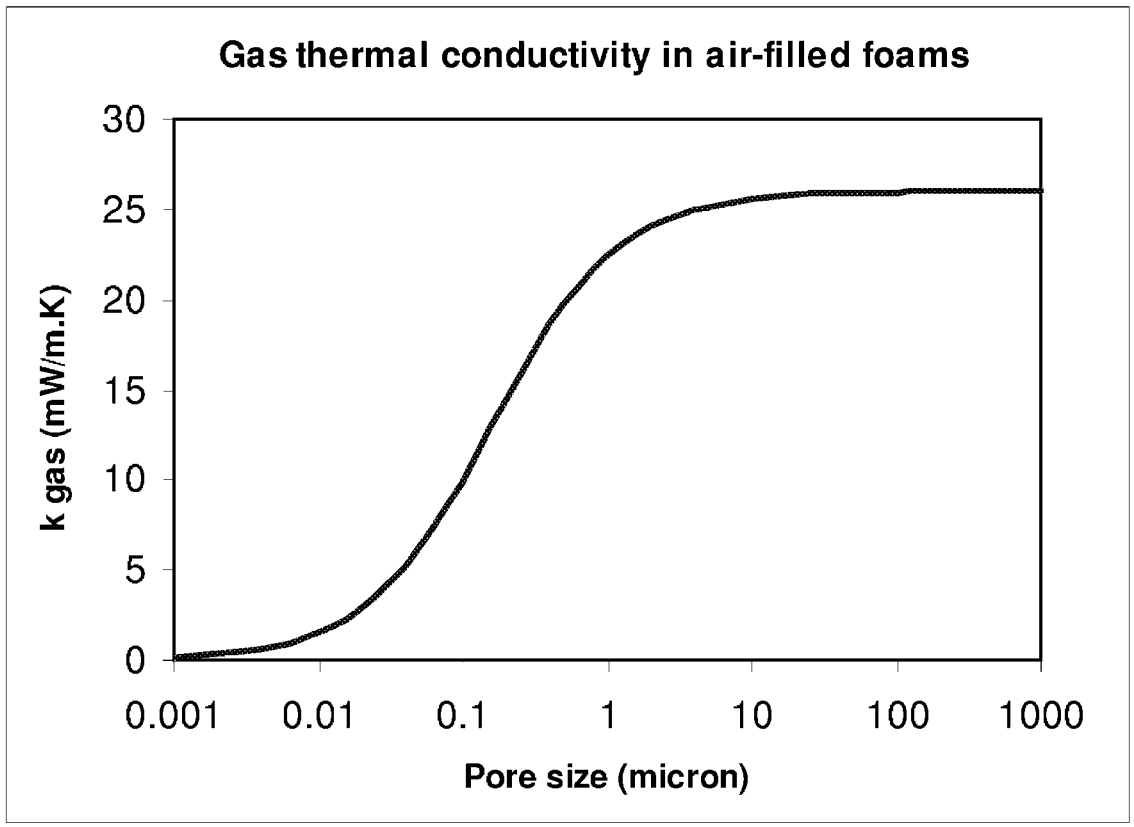
FIG. 1 illustrates a theoretical relationship between cell gas thermal conductivity contribution to polymeric foam thermal conductivity for air as cell gas as a function of average cell size of polymeric foam.

Test methods refer to the most recent test method as of the priority date of this document unless a date is indicated with the test method number. References to test methods contain both a reference to the testing society and the test method number. Test method organizations are referenced by one of the following abbreviations: ASTM refers to American Society for Testing and Materials; EN refers to European Norm; DIN refers to Deutsches Institute für Normung; and ISO refers to International Organization for Standards.

Foam articles have three mutually perpendicular dimensions: length, width and thickness. The length dimension lies along the longest dimension of a foam article and typically is along the extrusion direction of an extruded foam article. The thickness dimension is the dimension that has the smallest magnitude but can be equal to the length in, for example, a cube. Width is mutually perpendicular to length and thickness and can have a magnitude equal to or less than the length and equal to or greater than the thickness.

"Copolymer" refers to a polymer of two or more different monomers or monomer-containing polymers that have been grafted together, copolymerized together, or contain a portion that have been grafted and a portion that have been copolymerized.

"Methacrylate" and "methacrylic" are interchangeable herein.

"And/or" means "and, or as an alternative". All ranges include endpoints unless otherwise indicated.

The polymeric foam article of the present invention comprises a continuous thermoplastic polymer matrix. Important to the success of the present invention is the composition of that thermoplastic polymer matrix. More than 50 weight-percent (wt %) of all polymers in the thermoplastic polymer matrix must be one or more than one type of copolymer comprising at least two different monomers at least one of which is a methacrylate monomer, each of the at least two different monomers having a solubility parameter lower than 20 (megaPascals)$^{0.5}$ and a chemical composition such that twice the mass fraction of oxygen plus the mass fraction of each of nitrogen, fluorine and silicon in the one or combination of more than one monomer is greater than 0.2; wherein the at least two different monomers comprise at least 90 weight-percent, preferably at least 95 weight-percent and can make up 100 weight-percent of the total weight of monomers in the copolymer. Determine solubility parameter for a monomer from the tables in or by using the method set forth in Polymer Handbook, 4$^{th}$ Ed., Brandrup, J. et al. eds., John Wiley & Sons publishers (2005) chapter VII pages 682-686. The mass fraction of oxygen, nitrogen, fluorine and/or silicon can be zero.

The particular selection of monomers as being characterized by having both a solubility parameter lower than 20 (megaPascals)$^{0.5}$ and a chemical composition such that twice the mass fraction of oxygen plus the mass fraction of each of nitrogen, fluorine and silicon in the one or combination of more than one monomer is greater than 0.2 is an important feature of the present invention. Without being bound by theory, such a selection of copolymer components provides a particularly appropriate carbon dioxide affinity to result in proper imbibing of foaming agent in the polymer composition. Monomers containing carbon-oxygen bonds such as esters, ether moieties and chemical moieties containing nitrogen or fluorine have an ability to share electrons with carbon dioxide. Monomers with silicon atoms or ethers moieties presumably lower a cohesive energy density of polymer they are part of. These chemical features increase interaction with carbon dioxide when present in a copolymer. Using one or more monomer with these specified properties in combination with methacrylate monomer to form a copolymer results in a free volume increase compared to methacrylate homopolymer, thereby allowing for favorable solubilization of carbon dioxide.

Examples of suitable monomers having the requisite solubility parameter and mass fraction of oxygen, nitrogen, fluorine and silicon include those listed in Table 1:

TABLE 1

| Monomer | Chemical Composition | Solubility Parameter (MPa)^0.5 | Mass Fraction of 2O + N + F + Si |
|---|---|---|---|
| methyl methacrylate (MMA) | C5H8O2 | 18.5 | 0.639 |
| ethyl methacrylate (EMA) | C6H10O2 | 17.4 | 0.561 |
| ethyl acrylate (EA) | C5H8O2 | 18.2 | 0.639 |
| isobutyl methacrylate (iBMA) | C8H14O2 | 16.6 | 0.450 |
| n-butyl methacrylate (nBMA) | C8H14O2 | 17.2 | 0.450 |
| tert-butyl methacrylate (tBMA) | C8H14O2 | 16.2 | 0.450 |
| 2-(diethylamino)ethyl methacrylate (DEAMA) | C10H19NO2 | 18.1 | 0.421 |
| perfluorooctylethyl methacrylate (PFOEMA) | C14H9F17O2 | 15.2 | 0.727 |
| 3-(trimethoxysilyl)propyl methacrylate (MSMA) | C10H20O5Si | 17.7 | 0.757 |
| poly(ethylene glycol) methyl ether methacrylate (PEG-MMA) | C20H76O19 | 19.0 | 0.981 |
| vinyl acetate (VAc) | C4H6O2 | 18.6 | 0.743 |
| methacryl isobutyl POSS (iBPOSS) | C35H74O14Si8 | 17.1 | 0.714 |
| 2-ethylhexyl acrylate | C11H20O2 | 16.0 | 0.347 |
| vinyl fluoride | C2H3F | 10.0 | 0.413 |
| vinyltrimethoxysilane | C5H12O3Si | 16.4 | 0.837 |

Desirably, the methacrylate copolymer has a glass transition temperature that is at least 85 degrees Celsius (° C.) and can be 90° C. or more, even 95° C. or more. At the same time, the glass transition temperature of the methacrylate copolymer is desirably 250° C. or lower and can be 150° C. or lower, even 125° C. or lower.

In one desirable embodiment, the copolymer is other than a block copolymer. A block copolymer comprises two or more homopolymer subunits linked by covalent bonds. Desirably, the copolymer is a random copolymer. A random copolymer is a copolymer having two monomers polymerized together to form a polymer in a random or statistical distribution in the polymer chain. Particularly desirable is a statistical copolymer (a truly random copolymer).

The continuous thermoplastic polymer matrix of the present polymeric foam article can be free of polycarbonate, poly(lactic acid), fluorinated polymers or free of any combination of two or all three of polycarbonate, poly(lactic acid) and fluorinated polymers. The continuous thermoplastic polymer matrix can have a continuous non-fluorinated thermoplastic polymer other than polycarbonate and polylactic acid.

The continuous thermoplastic polymer matrix defines multiple cells, which are the cells of the polymeric foam article. The volume of the cells is sufficient to establish a porosity of greater than 0.30 (porosity percentage greater than 30%) in the polymeric foam article. Porosity serves as a measure of void volume fraction in a foam article. One way to measure porosity in a foam article is by determining the density ($\rho$) of non-void material in the foam article (that is, the continuous thermoplastic polymer matrix plus any additives and fillers dispersed in the matrix) and the density of the foam article ($\rho_f$) and then solve for porosity (p) using the following equation:

$$p = [1-(\rho_f)/(\rho)]$$

Porosity can also be reported as a porosity percentage by using:

$$p\% = [1-(\rho_f)/(\rho)] \times 100\%$$

Determine the density of the polymeric foam article ($\rho_f$) by the Archimedes method of ASTM method D-1622-03. Polymeric foam articles of the present invention desirably have a foam density of less than 0.2 grams per cubic centimeters (g/cm$^3$), and can have a density of 0.18 g/cm$^3$ or less.

Desirably, the porosity percentage ("porosity %") of thermoplastic polymer foam article of the present invention is 30% or more, preferably 50% or more, even more preferably 60% or more and can be 70% or more, 75% or more, 80% or more and even 90% or more.

The polymeric foam article possesses at least one of the following: an average cell size of 300 (or, desirably, a lower limit selected from those listed below) nanometers or less and/or a nucleation site density of at least $3\times10^{14}$ (or, desirably, a higher limit value selected from those listed below) effective nucleation sites per cubic centimeter of foamable polymer composition.

Desirably, the polymeric foam article has an average cell size of 300 nanometers (nm) or less, preferably 250 nm or less, still more preferably 200 nm or less and can have an average cell size of 150 nm or less and even 100 nm or less. Typically, the average cell size is at least 10 nm, or even 20 nm or more. Desirably, the polymeric foam article is substantially free of large cells, meaning that the volume fraction of cells larger than one micron is 10% or less, preferably 5% or less and still more preferably one percent or less relative to total foam volume. Notably, the polymeric foam can appear as a reticulated or reticular structure of polymeric struts in which case cells sizes correspond to the openings between struts.

Measure average cell size directly for a polymeric foam article according to the following procedure: (a) Examine a cross section of a polymeric foam article by scanning electron microscopy (SEM); (b) Examine at a first portion of the cross section that is five microns by five microns in dimensions; (c) Select five to ten groupings of ten to twenty cells; (d) Within each grouping select what appears to be an average-sized cell and measure the diameter of that cell and in a case where no cell representing a reasonable average size is evident (for example, in a bimodal cell size distribution where there are large and small cells but none representing an average of the large and small sizes) then measure at least 10 random cells in the grouping and determine the mean of those 10 cells; (e) repeat steps (c) and (d) on four to ten additional portions of the same cross section of polymeric foam article; (f) determine the average of all measured diameters and use that average value as the average cell size for the polymeric foam article. This process should include several hundred cells in determining the average—that is several hundred diameters should be measured and then averaged in step (f).

Desirably, the cell size has a monomodal cell size distribution. However, in any embodiment where the cells size distribution is other than monomodal the process of measuring average cell size should incorporate selection of cells for measuring diameter without consideration of whether the cell size is large or small in order to obtain a true average cell size.

For optimal thermal insulation properties it is desirable for 70% or more, preferably 80% or more and still more preferably 85% or more of all cells in the polymeric foam article have a cell size of less than 300 nanometers. Additionally, or alternatively, it is desirable for optimal thermal insulation properties for cell larger than one micron to occupy 20 volume percent or less, preferably 10 volume percent or less and most preferably 10 volume percent or less of the total foam volume while the average cell size is 200 nm or less. Measure the volume percent of cell larger than one micron (that is, microcells) relative to the total foam volume by: (a) examining a cross section of polymeric foam article by scanning electron microscopy (SEM); (b) examining a representative portion of the cross section at a magnification that makes several microcells visible if more than one are present in the representative portion; (c) analyze the representative portion with the help of the free software "ImageJ" available from the National Institutes of Health (see, for example, http://rsb.info.NIH.gov/ij) by using the "Analyze" function in the software to first set the scale of an image of the cross section and then draw a freehand line around the edges of a microcell and select "Measure" and repeat for each microcell in the image; (d) sum the area of all cells whose area is larger than 0.785 square microns (that is, having an area equal to or larger than a one micron diameter circle); (e) divide the sum of the areas by the area of the image and multiply by 100. According to a stereographic principle described in equation 2.11 of Chapter 2 of "Quantitative Stereology" by E. Underwood (Addison-Wesley Publishing Company, 1970) the area percent on random cross sections (Aa) is equal to the volume percent (Vv) of the reconstructed 3D object. Therefore, the volume percent of microcells relative to the total foam volume is equal to Aa as measured by SEM.

The polymeric foam article desirably has an effective nucleation site density of at least $3 \times 10^{14}$ sites per cubic centimeter (cm$^3$) of pre-foamed material (foamable polymer composition). The number of effective nucleation sites is equivalent to the number of nucleation sites that develop into a unique cell in the final foam. To be clear, cells that independently nucleate but that coalesce into a single cell correspond to a single effective nucleation site. Cells that nucleate, but collapse and disappear prior to formation of the final foam do not count as effective nucleation sites. Preferred embodiments of the thermoplastic polymeric foam article have an effective nucleation site density of $1 \times 10^{15}$ or more, preferably $3 \times 10^{15}$ or more, still more preferably $1 \times 10^{16}$ or more and can be $1 \times 10^{17}$ or more. Typically, the effective nucleation site density is less than about $1 \times 10^{19}$ in order to achieve porosity percentage greater than 30%.

Determine the effective nucleation site density ($N_0$) for a polymeric foam article from the porosity (p) of the polymeric foam article, the average cell size in nanometers ($d_{nm}$), the density of the polymeric foam article ($\rho_f$) and density of non-void material in the foam article ($\rho_p$), both in grams per cubic centimeter (g/cm$^3$). Start by calculating the average cell volume ($V_{cell}$) using:

$$V_{cell} = \frac{\pi d_{nm}^3 / 6}{10^{21}}$$

Determine the average number of cells per cubic centimeter of foam ($N_c$) using:

$$N_c = \frac{p}{V_{cell}} = \left[ 10^{21} \frac{1 - \rho_f / \rho_p}{\pi d_{nm}^3 / 6} \right]$$

Determine the effective nucleation density ($N_0$) using:

$$N_0 = \frac{N_c}{1-p} = \left[ 10^{21} \frac{\rho_p / \rho_f - 1}{\pi d_{nm}^3 / 6} \right]$$

Figure 2:
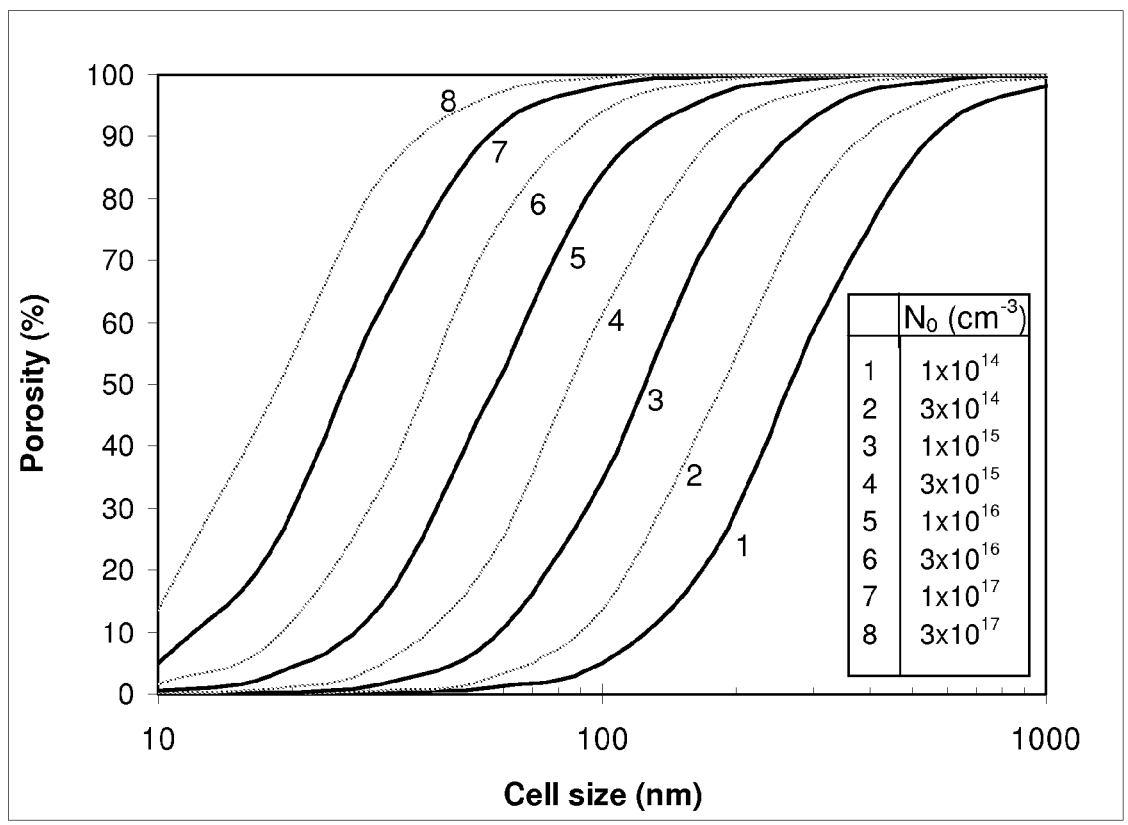
FIG. 2 illustrates a plot that correlates Nucleation Site Density to Average Cell Size and Porosity for a polymeric foam article.

Porosity, effective nucleation site density and average cell size are all inter-related and any two of the values allows calculating of the third. FIG. 2 illustrates a plot of porosity percentage versus average cell size and includes lines designating effective nucleation site density values. Such a plot allows one to use any two of porosity, average cell size and effective nucleation site density to determine the third.

Surprisingly, polymeric foam of the present invention is free of nano-sized particles detectable by X-ray photoelectron spectroscopy (XPS), small angle X-ray scattering, and/or dynamic light scattering performed on a foam sample dissolved in an organic solvent. Nano-sized particles can serve as nucleating agent facilitating the preparation of nanometer-sized cells in a polymeric foam (see, for example, U.S. patent application US Ser. No. 61/264,407). Nano-sized particles have at least two orthogonal dimensions that are less than one micrometer, preferably less than 500 nanometers, still more preferably less than 200 nanometers, even more preferably less than 100 nanometers and yet more preferably less than 75 nanometers, and most preferably less than 50 nanometers in length.

Desirably, the polymeric foam article of the present invention is free of a non-foamed skin (that is, a portion of the article on an exposed surface of the article that has a porosity percentage of less than 10%) that has a thickness exceeding five percent of the total thickness of the polymeric foam article on one or more exposed surface. Measure the thickness of the skin and foam in the same dimension.

The present polymeric foam articles are distinct from foamed thin polymeric films. The present polymeric foam articles have a thickness that is greater than one millimeter, preferably greater than two millimeters, still more preferably greater than three millimeters and even more preferably greater than four millimeters. The thickness of the present polymeric foam articles can be five millimeters or more, and even ten millimeters or more, even 25 millimeters or more and 50 millimeters or more. An upper limit on thickness is only limited by process equipment. Typically, the thickness of the present polymeric foam article is 250 millimeters or less.

The thickness of the polymeric foam articles of the present invention causes the polymeric foam articles to scatter and/or absorb infrared radiation effectively, which helps minimize thermal conductivity through the foam. Polymeric foam articles of the present invention desirably have a transmittance of less than 5%, preferably less than 4.5% and can have a transmittance of less than 4%, less than 3%, less than 2%, or even 1% or less at all wavelengths between 200 nm and 40,000 nm.

The polymeric foam of the present invention can further comprise additional additives. Examples of suitable additional additives include: infrared attenuating agents (for example, carbon black, graphite, metal flake, titanium dioxide or other metal oxides); clays such as natural absorbent clays (for example, kaolinite and montmorillonite) and synthetic clays; fillers (for example, talc and magnesium silicate); flame retardants (for example, brominated flame retardants such as hexabromocyclododecane and brominated polymers, phosphorous flame retardants such as triphenylphosphate, and flame retardant packages that may including synergists such as, or example, dicumyl and polycumyl); lubricants (for example, calcium stearate and barium stearate); acid scavengers (for example, magnesium oxide and tetrasodium pyrophosphate); pigments blowing agent stabilizers; surfactants and other surface tension modifiers (for example fatty acids and their derivatives).

The process of the present invention prepares the polymeric foam of the present invention. In general, the process comprises: (a) providing at an initial temperature and pressure a foamable polymer composition that comprises a thermoplastic polymer matrix and a blowing agent wherein the foamable polymer composition is in a softened state that is capable of expanding, but is also at a foaming temperature below the softening temperature of the thermoplastic polymer matrix and the initial pressure is high enough to preclude foaming; and (b) rapidly exposing the foamable polymer composition to a pressure below the initial pressure while allowing the foamable polymer composition to expand into a polymeric foam article. The process can further comprise a secondary expansion step after step (b) wherein the polymeric foam article produced in step (b) is further expanded upon heating of the polymeric foam article. The secondary expansion step can occur by, for example, application of steam, radiation (for example, infrared radiation, microwave radiation, radio frequency radiation and ultrasound radiation), subjecting the article to a vacuum or any combination of two or more of these.

The thermoplastic polymer matrix for use in the process of the present invention is as described for the thermoplastic polymeric foam of the present invention.

The softening temperature for a thermoplastic polymer matrix is the glass transition temperature for an amorphous polymer and the melting temperature for a semi-crystalline polymer. If a thermoplastic polymer matrix comprises more than one continuous amorphous polymer, the softening temperature is the highest glass transition temperature of the continuous amorphous polymers. Likewise, if the thermoplastic polymer matrix comprises more than one continuous semicrystalline polymer, the softening temperature is the highest melting temperature of the continuous semicrystalline polymers. If the thermoplastic polymer matrix comprises both continuous amorphous and continuous semicrystalline polymers, the softening temperature is the higher of the highest glass transition temperature of the continuous amorphous polymers and the highest melting temperature of the semicrystalline polymers.

The foaming temperature for the foamable polymer composition is a temperature wherein the foamable polymer composition is in a softened state yet is below the softening temperature of the neat thermoplastic polymer matrix of the foamable polymer composition. Desirably, the foaming temperature is 40° C. or more, preferably 50° C. or more below the softening temperature for the neat thermoplastic polymer matrix. The reason the foaming temperature can be so low is because the blowing agent plasticizes the thermoplastic polymer resin thereby lowering the softening temperature of the foamable polymer composition below the softening temperature of the neat thermoplastic polymer.

The blowing agent comprises carbon dioxide in either a liquid or a supercritical state. Carbon dioxide makes up from 50 mol % to 100 mol % of the total blowing agent composition. Additional blowing agents, if present can be selected from any blowing agent commonly used for preparing polymeric foam. Suitable blowing agents include one or more than one of the following: inorganic gases such as argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitro-sotereph-thalamide, trihydrazino triazine and sodium bicarbonate.

The concentration of total blowing agent in a foamable polymer composition is desirably 18 wt % or more, preferably 20 wt % or more, even more preferably 22 wt % or more and most preferably 24 wt % or more in order to achieve desirable porosity. At the same time, the amount of blowing agent is generally 50 wt % or less, typically 45 wt % or less and often 40 wt % or less. Desirably, carbon dioxide is present at a concentration of 20 wt % or more, preferably 22 wt % or more and most preferably 25 wt % or more. At the same time, carbon dioxide is typically present at a concentration of 50 wt % or less, preferably 45 wt % or less and most preferably 40 wt % or less. Wt % is relative to the total weight of the foamable polymer composition.

The foamable polymer composition can contain additionally additives as described for the polymeric foam article of the present invention.

The combination of thermoplastic polymer composition and blowing agent creates a foamable polymer composition. The foamable polymer composition remains under an initial pressure that is sufficient so as to dissolve the blowing agent into the thermoplastic polymer and to preclude foaming of the foamable polymer composition due to expansion of the blowing agent. Once all of the blowing agent and any desirable additional additives are mixed into a foamable polymer composition the foamable polymer composition is rapidly exposed to an atmosphere at a lower pressure than the initial pressure in order to allow foaming to occur. The rate of depressurization can influence the effective nucleating site density. Desirably, the initial rate of pressure decrease is 10 MegaPascals per second (MPa/s) or more, preferably 20 MPa/s or more, more preferably 100 MPa/s or more and most preferably 200 MPa/s or more.

The foamable polymer composition begins expansion at the foaming temperature of the expandable polymer composition. During expansion, the foamable polymer composition expands and cools to form a polymeric foam article. Optionally, an additional conditioning step is beneficial wherein the resulting foam is exposed to further heat and possibly steam to induce additional expansion before becoming a polymeric foam article of the present invention.

Foaming can occur by any foaming technique suitable for preparing thermoplastic polymeric foams including batch tank foaming and extrusion foaming.

In batch tank foaming provide a thermoplastic polymer matrix that contains the nucleating additive into a pressure vessel (tank), provide blowing agent into the vessel and pressure the inside of the vessel sufficiently high so as to dissolve the blowing agent in the thermoplastic polymer matrix to a desired concentration. Once a desired concentration of blowing agent is dissolved in the thermoplastic polymer matrix the pressure in the vessel is relieved while the thermoplastic polymer matrix is in a softened state at the foaming temperature and the thermoplastic polymer matrix is allowed to expand into a thermoplastic polymeric foam article. Typically, dissolving blowing agent into the thermoplastic polymer matrix under pressure is sufficient to plasticize the thermoplastic polymer matrix into a softened state without requiring heating above the neat polymer matrix softening temperature (softening temperature in an absence of carbon dioxide), although heat may be applied to the tank if necessary to soften the thermoplastic polymer matrix to facilitate foaming.

An extrusion foam process comprises providing a foamable composition in an extruder at an initial pressure and in a softened state and then expelling the foamable composition at a foaming temperature into an environment of lower pressure than the initial pressure to initiate expansion of the foamable composition into a thermoplastic polymer foam. An extrusion process can be continuous or semi-continuous (for example, accumulative extrusion). In a general extrusion process, prepare a foamable polymer composition by mixing a thermoplastic polymer with a blowing agent in an extruder by heating a thermoplastic polymer composition to soften it, mixing a blowing agent composition together with the softened thermoplastic polymer composition at a mixing (initial) temperature and initial pressure that precludes expansion of the blowing agent to any meaningful extent (preferably, that precludes any blowing agent expansion), desirably cool the foamable polymer composition to a foaming temperature rather than use the initial temperature as the foaming temperature, and then expelling the foamable composition through a die into an environment having a temperature and pressure below the foaming temperature and initial pressure. Upon expelling the foamable composition into the lower pressure the blowing agent expands the thermoplastic polymer into a thermoplastic polymer foam. Desirably, cool the foamable composition after mixing and prior to expelling it through the die. In a continuous process, expel the foamable composition at an essentially constant rate into the lower pressure to enable essentially continuous foaming.

Suitable extrusion foam processes may benefit from cooling the foamable polymer composition to a foaming temperature below the initial temperature before expanding and extensive mixing of foamable polymer composition after cooling to the foaming temperature and prior to extrusion.

Accumulative extrusion is a semi-continuous extrusion process that comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone having a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand into foam.

Coalesced strand foam processes are also suitable embodiments of the present extrusion process. In general, during coalesced strand foam process a foamable polymer composition extrudes through a die containing multiple orifices oriented such that when the foamable polymer composition expands upon extrusion the resulting strands of foaming polymer contact one another and partially coalesce together. The resulting foam article ("strand foam") is a composition of foam strands extending in the extrusion direction of the foam. A skin typically defines each strand in the coalesced strand foam. While coalesced strand foam processes are suitable, the process can be free of forming independent foam strands and then subsequently fusing the strands together to form stand foam.

Extruded foams and batch tank foams are distinct from expanded polymer bead foam by being free from encapsulated collections of beads. While a strand foam has a skin similar to bead foam, the skin of a strand foam does not fully encapsulate groups of cells but rather forms a tube extending only in the extrusion direction of the foam. The polymeric foam articles of the present invention are preferably batch tank polymeric foam (polymeric foam prepared from a batch tank process) or extruded polymeric foams. Desirably the process of the present invention is a batch tank process or an extrusion foam process.

In one embodiment the thermoplastic foam article of the present invention can further have a crosslinked thermoplastic polymer matrix. Crosslinking a thermoplastic polymer matrix can occur upon irradiation of the polymer matrix with the proper frequency radiation or by including molecules with latent crosslinkable moieties in the composition. Often, the polymer matrix contains an initiator that instigates crosslinking and/or serves as a crosslinker between polymer chains upon irradiation or stimulation (for example, by heat, moisture or a combination thereof). Crosslinking, if done, typically occurs after all expansion is complete. Crosslinking can occur as expansion proceeds, but that is a more difficult process and causes viscosity increase in the polymer matrix during expansion.

Foam article of the present invention have many utilities including serving as thermally insulating articles and filtration articles (for liquids and/or gasses). The thermoplastic foam article of the present invention can be incorporated into a more complex article to form, for example, a thermally insulating composite article comprising a facer (such as a polymeric film), rigid substrate, or both.

EXAMPLES

The following examples serve to illustrate embodiments of the present invention. The following examples (Exs) and comparative examples (Comp Exs) use polymers or copolymers comprising one or more of the following monomers:

Foaming Procedure.

For a given polymer (see the specific Examples and Comparative Examples polymer compositions) compression mold a three millimeter thick sheet of the copolymer by compressing at 200 degrees Celsius (° C.) and 69 MegaPascals pressure for two minutes. Cut the sheet into pieces having a four millimeter width and approximately a 20 millimeter length to use in the following batch foaming process.

Prepare polymeric foam articles by a batch foaming process using a high pressure stainless steel vessel connected to a source of pressurized carbon dioxide and containing a pressure release valve. The volume of the vessel is between seven and 55 milliliters. Insert into the vessel the pieces of copolymer sheet, which will serve as the thermoplastic polymer matrix for the foam) so as to fill approximately 5-10% of the vessel volume. Over filling the vessel will preclude sufficient expansion of the polymer during foaming. Seal the vessel with the thermoplastic polymer matrix (pieces of copolymer sheet) inside and pressurize the vessel with carbon dioxide to a Soak Pressure and condition to a Soak Temperature. Allow the vessel to remain pressurized for a specific Soak Time and then rapidly release the pressure in the vessel using the pressure release valve to achieve a depressurization rate of at least 20 MegaPascals (MPa) per second. Inside the vessel, the polymer matrix foams to form a polymeric foam article. For select samples perform a secondary expansion within one minute of depressurization by immersing the polymeric foam article in to a heated water bath at the temperature and for the time indicated for the example or comparative example.

The resulting polymeric foam articles in each of the Examples have a thickness in a range of three to six millimeters.

Comparative Examples A and B

Methacrylate Homopolymer

Prepare a foam in the manner described using instead of a methacrylate copolymer a poly(methylmethacrylate) homopolymer (120,000 g/mol weight average molecular weight from Sigma-Aldrich). Use a soak temperature of 35° C., a soak pressure of 30 MPa and a soak time of six hours, sufficient time to fully saturate the three millimeter thick specimen with carbon dioxide. The resulting polymeric foam article (Comp Ex A) has a bimodal cell size distribution with an average large cell size of approximately 110 micrometers and an average small cell size of approximately 400 nanometers. The Porosity Percentage is 59. Comp Ex A has a density of 0.48 grams per cubic centimeter (g/cm$^3$). More than 40 volume percent of the cells have a cell size larger than one micron, relative to total foam volume.

Prepare a similar foam article except use a soak temperature of 40° C., a soak pressure of 29 MPa and a soak time of five hours, sufficient time to fully saturate the three millimeter thick specimen with carbon dioxide. Subject the resulting foam to a secondary expansion by submerging the foam for two minutes in 68° C. water and allow the foam to expand further. The resulting polymeric foam article (Comp Ex B) has a bimodal cell size distribution with an average large cell size of approximately 100 micrometers and an average small cell size of approximately 460 nanometers. The Porosity Percentage is 81. Comp Ex B has a density of 0.22 g/cm$^3$. More than 70 volume percent of the cells have a cell size larger than one micron relative to total foam volume.

Comp Exs A and B illustrate the challenge to produce a nanocellular polymeric foam using a methacrylate homopolymer in an absence of a nucleating agent.

Examples 1-11

Methyl Methacrylate/Ethyl Methacrylate Copolymer

Prepare polymeric foam in the manner described using a copolymer that is 50 wt % methylmethacrylate and 50 wt % ethyl methacrylate by monomer weight using process parameter in Table 2. The copolymer has a glass transition temperature of 96° C. Resulting polymeric foam properties are also in Table 2.

TABLE 2

| | Process Parameters | | | | Foam Properties | | | |
| --- | --- | --- | --- | --- | --- | --- | --- | --- |
| Sample | Soak Temp (° C.) | Soak Pressure (MPa) | Soak Time (hr) | Secondary Expansion (Y/N)* | Average Cell Size (nm) | Porosity Percentage (%) | Effective Nucleation site Density (cm$^{-3}$) | Foam Density (g/cm$^3$) |
| Ex 1 | 35 | 30 | 6 | N | 75 | 73 | $1.2 \times 10^{16}$ | 0.32 |
| Ex 2 | 35 | 30 | 6 | Y(40) | 80 | 77 | $1.2 \times 10^{16}$ | 0.27 |
| Ex 3 | 35 | 30 | 6 | Y(50) | 80 | 80 | $1.5 \times 10^{16}$ | 0.23 |
| Ex 4 | 35 | 30 | 6 | Y(60) | 80 | 82 | $1.7 \times 10^{16}$ | 0.21 |
| Ex 5 | 35 | 30 | 6 | Y(70) | 80 | 80 | $1.5 \times 10^{16}$ | 0.24 |
| Ex 6 | 35 | 30 | 6 | Y(80) | 90 | 77 | $8.8 \times 10^{15}$ | 0.27 |
| Ex 7 | 50 | 33 | 4.5 | Y(85) | 230 | 82 | $7.1 \times 10^{14}$ | 0.21 |
| Ex 8 | 40 | 24 | 4.5 | Y(80) | 150 | 84 | $3.1 \times 10^{15}$ | 0.18 |
| Ex 9 | 50 | 33 | 4.5 | Y(80) | 200 | 85 | $1.4 \times 10^{15}$ | 0.17 |
| Ex 10 | 40 | 33 | 7 | Y(70) | 100 | 84 | $1.0 \times 10^{16}$ | 0.18 |
| Ex 11 | 50 | 33 | 4.5 | Y(80) | 110 | 83 | $7.2 \times 10^{15}$ | 0.19 |

*Secondary expansion is expressed either as "N" meaning no secondary expansion or Y(X) indicating a 3 minute submersion in water at a temperature of X° C.

One volume percent of the cells in Exs 9 and 10 have a cell size greater than one micron based on total foam volume. Less than one volume percent of the cells in Exs 1-8 have a cell size greater than one micron based on total foam volume.

Exs 1-11 illustrate examples of the present invention using a copolymer of methyl methacrylate and ethyl methacrylate. In these examples, 100% of the monomers are methacrylate monomers and 100% of the monomers have the requisite solubility parameter and mass fraction of oxygen, nitrogen, fluorine and silicon.

Of particular note are Exs 8-11 that achieve a density below 0.2 g/cm$^3$ without requiring a nucleating additive.

Exs 12-15

Methyl Methacrylate/Ethyl Acrylate Copolymers

Prepare polymeric foam in the manner described using a copolymer of methyl methacrylate and ethyl acrylate monomers with the ethyl acrylate monomer ranging in concentration from 1.5 to 11.4 wt % of the total monomers, balance being methyl methacrylate. See Table 3 for the amount of ethyl acrylate for each example. The glass transition temperatures of the polymers for the examples are as follows: Ex 12 (111° C.), Ex 13 (97° C.), Exs 14-15 (95° C.). Table 3 further provides process parameters and resulting foam properties.

TABLE 3

| Sample | Process Parameters | | | | Foam Properties | | | |
|---|---|---|---|---|---|---|---|---|
| | wt % EA | Soak Temp (° C.) | Soak Pressure (MPa) | Soak Time (hr) | Secondary Expansion (Y/N)* | Average Cell Size (nm) | Porosity % (%) | Effective Nucleation site Density $(cm^{-3})$ | Foam Density $(g/cm^3)$ |
| Ex 12 | 4.5 | 35 | 30 | 6 | N | 126 | 51 | $1.0 \times 10^{15}$ | 0.57 |
| Ex 13 | 11.4 | 35 | 30 | 6 | N | 134 | 71 | $2.0 \times 10^{15}$ | 0.33 |
| Ex 14 | 8.9 | 35 | 30 | 6 | Y(80) | 120 | 56 | $1.4 \times 10^{15}$ | 0.51 |
| Ex 15 | 8.9 | 30 | 30 | 6 | Y(70) | 220 | 78 | $6.5 \times 10^{14}$ | 0.25 |

*Secondary expansion is expressed either as "N" meaning no secondary expansion or Y(X) indicating a 3 minute submersion in water at a temperature of X° C.

Less than one volume percent of the cells in each of Exs 12-14 have a cell size greater than one micron based on total foam volume. One volume percent of the cells in Ex 15 has a cell size greater than one micron based on total foam volume.

Exs 12-15 illustrate examples of the present invention using a copolymer of methyl methacrylate and ethyl acrylate. In these examples, 88.6-95.5 wt % of the monomers are methacrylate monomers. 100 wt % of the monomers have the requisite solubility parameter and mass fraction of oxygen, nitrogen, fluorine and silicon.

Transmittance over the wavelength range of 200-40,000 nanometers was measured for Ex 15. Ex 15 has a thickness of 7.5 millimeters. The maximum transmittance value over that wavelength range is 0.38%. Measuring a portion of Ex 15 having a thickness of 1.9 millimeters thick demonstrates a maximum transmittance value over that range of 4.4%. Maximum transmittance occurs at a wavelength of approximately 825 nanometers.

Exs 16-19

Methyl Methacrylate/Vinyl Acetate Copolymers

Prepare polymeric foam in the manner described using a copolymer of methyl methacrylate and vinyl acetate monomers with the vinyl acetate monomer ranging in concentration from 7.5 to 10.6 wt % of the total monomers, the balance being methyl methacrylate. See Table 4 for the amount of vinyl acetate for each example. The glass transition temperatures for the polymers in each example are as follows: Exs 16 and 17 (110° C.), Ex 18 (106° C.) and Exs 18 and 19 (99° C.). Table 4 further provides process parameters and resulting foam properties.

Less than one volume percent of the cells in Exs 16, 18 and 19 have a cell size greater than one micron based on total foam volume. Four volume percent of the cells in Ex 17 have a cell size greater than one micron based on total foam volume.

Exs 16-19 illustrate examples of the present invention using a copolymer of methyl methacrylate and vinyl acetate. In these examples, 89.4-92.5 wt % of the monomers are methacrylate monomers. 100 wt % of the monomers have the requisite solubility parameter and mass fraction of oxygen, nitrogen, fluorine and silicon.

Ex 20

Methyl Methacrylate/Vinyl Acetate/Ethyl Acrylate Copolymer

Prepare polymeric foam in the manner described using a copolymer of 90.3 wt % methyl methacrylate, 7.1 wt % vinyl acetate and 2.6 wt % ethyl acrylate monomers. The copolymer has a glass transition temperature of 106° C. See Table 5 for process parameters and resulting foam properties.

Less than one volume percent of the cells in Ex 20 have a cell size greater than one micron relative to total foam volume.

TABLE 4

| Sample | Process Parameters | | | | Foam Properties | | | |
|---|---|---|---|---|---|---|---|---|
| | wt % VAC | Soak Temp (° C.) | Soak Pressure (MPa) | Soak Time (hr) | Secondary Expansion (Y/N)* | Ave Cell Size (nm) | Porosity % (%) | Effective Nucleation site Density $(cm^{-3})$ | Foam Density $(g/cm^3)$ |
| Ex 16 | 7.5 | 35 | 30 | 6 | N | 76 | 54 | $5.1 \times 10^{15}$ | 0.54 |
| Ex 17 | 7.5 | 35 | 30 | 6 | Y(60) | 165 | 76 | $1.4 \times 10^{15}$ | 0.28 |
| Ex 18 | 10.6 | 15 | 30 | 6 | Y(60) | 95 | 74 | $6.2 \times 10^{15}$ | 0.31 |
| Ex 19 | 10.6 | 30 | 30 | 6 | N | 87 | 71 | $7.2 \times 10^{15}$ | 0.33 |

*Secondary expansion is expressed either as "N" meaning no secondary expansion or Y(X) indicating a 3 minute submersion in water at a temperature of X° C.

TABLE 5

| | Process Parameters | | | | Foam Properties | | | |
|---|---|---|---|---|---|---|---|---|
| | | | | | | | Effective | |
| Sample | Soak Temp (° C.) | Soak Pressure (MPa) | Soak Time (hr) | Secondary Expansion (Y/N)* | Average Cell Size (nm) | Porosity Percentage (%) | Nucleation site Density (cm$^{-3}$) | Foam Density (g/cm$^3$) |
| Ex 20 | 35 | 30 | 6 | N | 200 | 71 | 5.8 × 10$^{14}$ | 0.34 |

*Secondary expansion is expressed either as "N" meaning no secondary expansion or Y(X) indicating a 3 minute submersion in water at a temperature of X° C.

Ex 20 illustrates and example of the present invention using a copolymer of methyl methacrylate, vinyl acetate and ethyl acrylate. In these examples, 90.3 wt % of the monomers are methacrylate monomers. 100 wt % of the monomers have the requisite solubility parameter and mass fraction of oxygen, nitrogen, fluorine and silicon.

Ex 21-27

Methyl Methacrylate/Ethyl Methacrylate/Ethyl Acrylate

Prepare polymeric foam in the manner described using a copolymer of methyl methacrylate and vinyl acetate monomers in the following ratios:

| Sample | wt % MMA | wt % EMA | wt % EA | Glass Transition Temperature (° C.) |
|---|---|---|---|---|
| Ex 21 | 93.6 | 4.9 | 1.5 | 118 |
| Ex 22 | 77.4 | 20.6 | 2 | 111 |
| Ex 23 | 77.4 | 20.6 | 2 | 111 |
| Ex 24 | 48 | 50.5 | 1.5 | 96 |
| Ex 25 | 48 | 50.5 | 1.5 | 96 |
| Ex 26 | 48 | 50.5 | 1.5 | 96 |
| Ex 27 | 48 | 50.5 | 1.5 | 96 |

Table 6 provides process parameters and resulting foam properties.

Less than one volume percent of the cells in Exs 21-23 and 24-27 have a cell size greater than one micron based on total foam volume. One volume percent of the cells in Ex 24 have a cell size greater than one micron based on total foam volume.

Exs 21-27 illustrate examples of the present invention using a copolymer of methyl methacrylate, ethyl methacrylate and ethyl acrylate. In these examples, 98-99.5 wt % of the monomers are methacrylate monomers. 100 wt % of the monomers have the requisite solubility parameter and mass fraction of oxygen, nitrogen, fluorine and silicon.

Ex 28-30

Methyl Methacrylate/Butyl Methacrylate/Ethyl Acrylate

Prepare polymeric foam in the manner described using a copolymer of methyl methacrylate, butyl methacrylate and ethyl acrylate in the following ratios:

| Sample | wt % MMA | wt % EA | wt % nBMA | wt % iBMA | wt % tBMA | Glass Transition Temperature (° C.) |
|---|---|---|---|---|---|---|
| Ex 28 | 93 | 1.8 | 5.2 | 0 | 0 | 110 |
| Ex 29 | 83.5 | 1.6 | 0 | 14.9 | 0 | 113 |
| Ex 30 | 83.4 | 1.7 | 0 | 0 | 14.9 | 120 |

Table 7 provides process parameters and resulting foam properties.

TABLE 6

| | Process Parameters | | | | Foam Properties | | | |
|---|---|---|---|---|---|---|---|---|
| | | | | | | | Effective | |
| Sample | Soak Temp (° C.) | Soak Pressure (MPa) | Soak Time (hr) | Secondary Expansion (Y/N)* | Average Cell Size (nm) | Porosity Percentage (%) | Nucleation site Density (cm$^{-3}$) | Foam Density (g/cm$^3$) |
| Ex 21 | 35 | 30 | 6 | N | 140 | 30 | 3.0 × 10$^{14}$ | 0.81 |
| Ex 22 | 35 | 30 | 6 | N | 101 | 46 | 1.6 × 10$^{15}$ | 0.64 |
| Ex 23 | 35 | 30 | 6 | Y(70) | 173 | 76 | 1.2 × 10$^{15}$ | 0.28 |
| Ex 24 | 35 | 30 | 6 | N | 186 | 70 | 7.0 × 10$^{14}$ | 0.35 |
| Ex 25 | 35 | 30 | 6 | N | 200 | 72 | 6.2 × 10$^{14}$ | 0.32 |
| Ex 26 | 15 | 30 | 6 | Y(40) | 100 | 71 | 4.7 × 10$^{15}$ | 0.34 |
| Ex 27 | 15 | 33 | 6 | N | 274 | 65 | 8.9 × 10$^{15}$ | 0.40 |

*Secondary expansion is expressed either as "N" meaning no secondary expansion or Y(X) indicating a 3 minute submersion in water at a temperature of X° C.

TABLE 7

| | Process Parameters | | | | Foam Properties | | | |
|---|---|---|---|---|---|---|---|---|
| | | | | | | | Effective | |
| Sample | Soak Temp (° C.) | Soak Pressure (MPa) | Soak Time (hr) | Secondary Expansion (Y/N)* | Average Cell Size (nm) | Porosity Percentage (%) | Nucleation site Density ($cm^{-3}$) | Foam Density ($g/cm^3$) |
| Ex 28 | 35 | 30 | 6 | N | 115 | 50 | $1.2 \times 10^{15}$ | 0.59 |
| Ex 29 | 35 | 30 | 6 | N | 80 | 53 | $4.2 \times 10^{15}$ | 0.55 |
| Ex 30 | 35 | 30 | 6 | N | 70 | 52 | $5.9 \times 10^{15}$ | 0.57 |

*Secondary expansion is expressed either as "N" meaning no secondary expansion or Y(X) indicating a 3 minute submersion in water at a temperature of X° C.

Exs 28-30 illustrate examples of the present invention using a copolymer of methyl methacrylate, butyl methacrylate and ethyl acrylate. In these examples, 98.2-98.4 wt % of the monomers are methacrylate monomers. 100 wt % of the monomers have the requisite solubility parameter and mass fraction of oxygen, nitrogen, fluorine and silicon.

Ex 31

Blend of Methyl Methacrylate/Ethyl Acrylate and Styrene Acrylonitrile

Melt blend at 200° C. in a Haake mixer 35 grams of a copolymer containing 91.1 wt % methyl methacrylate and 8.9 wt %/ethyl acrylate (copolymer glass transition temperature is 96° C.) with 15 grams of a copolymer containing 73 wt % styrene and 27 wt % acrylonitrile (copolymer glass transition temperature is 106° C.) to form a thermoplastic polymer blend that is 70 wt % methacrylic copolymer and 30 wt % styrenic copolymer.

Prepare polymeric foam in like manner as described for the other Examples using a soak temperature of 30° C., soak pressure of 33 MPa, soak time of 10 hours, secondary expansion utilizing a 3 minute submersion in water at a temperature of 60° C. to achieve a polymeric foam having an average cell size of 111 nm, a porosity % of 62%, an effective nucleation site density of $2.3 \times 10^{15}$ $cm^{-3}$, a foam density of 0.42 $g/cm^3$ and with two volume percent of the cells having a cell size greater than one micron based on total foam volume.

The invention claimed is:

1. A polymeric foam article comprising a thermoplastic polymer matrix that defines multiple cells therein, the polymeric foam article characterized by:
   a. the thermoplastic polymer matrix comprising greater than 50 weight-percent based on total polymer weight in the thermoplastic polymer matrix of at least one copolymer comprising at least two different monomers, each having a solubility parameter lower than 20 (megaPascals)$^{0.5}$ and a chemical composition such that twice the mass fraction of oxygen plus the mass fraction of each of nitrogen, fluorine and silicon in the one or combination of more than one monomer is greater than 0.2, wherein at least one of the at least two different monomers is a methacrylate monomer and wherein the at least two different monomers comprise at least 90 weight-percent of the total weight of monomers in the copolymer;
   b. a nucleation site density of at least $3 \times 10^{14}$ effective nucleation sites per cubic centimeter of foamable polymer composition;
   c. a porosity percentage that is greater than 30%;
   d. an absence of nano-sized nucleating additive; and
   e. a thickness of at least one millimeter.

2. The polymeric foam article of claim 1, wherein the copolymer is other than a block copolymer.

3. The polymeric foam article of claim 1, wherein the copolymer has a glass transition temperature that is greater than 85 degrees Celsius.

4. The polymeric foam article of claim 1, wherein 70% or more of all cells in the polymeric foam article have a cell size of less than 150 nanometers.

5. The polymeric foam article of claim 1, further characterized by having an average cell size of 200 nanometers or less wherein the amount of cells having a cells size larger than one micron is 10 volume percent or less relative to total foam volume.

6. The polymeric foam article of claim 1, further characterized by having a porosity percentage of more than 70%.

7. The polymeric foam article of claim 1, wherein the polymeric foam article has a density of less than 0.2 grams per cubic centimeter.

8. The polymeric foam article of claim 1, wherein the thermoplastic polymer matrix comprises crosslinked thermoplastic polymers.

9. A process for preparing the polymeric foam article of claim 1, the process comprising:
   a. providing a foamable polymer composition comprising a thermoplastic polymer matrix and a blowing agent dispersed therein, the polymer composition having a glass transition temperature and being at an initial pressure that precludes expansion of the blowing agent and an initial temperature that is above the softening temperature of the foamable polymer composition, where the thermoplastic polymer matrix comprises greater than 50 weight-percent based on total polymer weight in the thermoplastic polymer matrix of at least one copolymer comprising at least two different monomers, each having a solubility parameter lower than 20 (megaPascals)$^{0.5}$ and a chemical composition such that twice the mass fraction of oxygen plus the mass fraction of each of nitrogen, fluorine and silicon in the one or combination of more than one monomer is greater than 0.2, wherein at least one of the at least two different monomers is a methacrylate monomer and wherein the at least two different monomers comprise at least 90 weight-percent of the total weight of monomers in the copolymer;
   b. if the initial temperature is higher than the foaming temperature, cooling the foamable polymer composition to a foaming temperature that is above the softening temperature of the foamable polymer composition yet below the softening temperature of the neat thermoplastic polymer matrix of the foamable polymer composition; and
   c. rapidly exposing the foamable polymer composition to an atmosphere having a pressure below the initial pressure and allowing the foamable polymer composition to expand into a polymeric foam article having a thickness of at least one millimeters;

wherein the glass transition temperature of the thermoplastic polymer matrix is greater than 85° C. and the foaming temperature is at least 40° C. below the glass transition temperature of the thermoplastic polymer matrix wherein the polymer foam article is a polymer foam article of claim 1.

10. The process of claim 9, further characterized by the copolymer being other than a block copolymer.

11. The process of claim 9, further comprising heating the polymeric foam article of step (c) to achieve a secondary expansion that reduces the density of the polymeric foam article.

12. The process of claim 9, wherein the process is an extrusion process and step (c) occurs by extruding the foamable polymer composition through a foaming die.

13. The process of claim 9, wherein the foamable polymer composition contains at least 20 weight-percent carbon dioxide based on total foamable polymer composition weight.

14. The process of claim 9, further comprising inducing crosslinking of the thermoplastic polymer matrix during or after expansion in step (c).

\* \* \* \* \*